(12) United States Patent
Ahn et al.

(10) Patent No.: US 11,888,124 B2
(45) Date of Patent: Jan. 30, 2024

(54) SECONDARY BATTERY AND METHOD FOR MANUFACTURING THE SAME

(71) Applicant: LG Chem, Ltd., Seoul (KR)

(72) Inventors: Chang Bum Ahn, Daejeon (KR); Dong Hee Sul, Daejeon (KR); Young Joo Yang, Daejeon (KR)

(73) Assignee: LG Energy Solution, Ltd.

( * ) Notice: Subject to any disclaimer, the term of this patent is extended or adjusted under 35 U.S.C. 154(b) by 211 days.

(21) Appl. No.: 17/358,321

(22) Filed: Jun. 25, 2021

(65) Prior Publication Data

US 2021/0320336 A1 Oct. 14, 2021

Related U.S. Application Data

(62) Division of application No. 15/744,325, filed as application No. PCT/KR2016/012664 on Nov. 4, 2016, now Pat. No. 11,081,732.

(30) Foreign Application Priority Data

Nov. 11, 2015 (KR) .......................... 10-2015-0158424
Nov. 3, 2016 (KR) .......................... 10-2016-0145522

(51) Int. Cl.
*H01M 10/38* (2006.01)
*H01M 10/04* (2006.01)
*H01M 50/46* (2021.01)
*H01M 50/406* (2021.01)
*H01M 50/466* (2021.01)
(Continued)

(52) U.S. Cl.
CPC .............. *H01M 10/38* (2013.01); *H01M 4/04* (2013.01); *H01M 10/0436* (2013.01); *H01M 10/0463* (2013.01); *H01M 50/406* (2021.01); *H01M 50/443* (2021.01); *H01M 50/46* (2021.01);
(Continued)

(58) Field of Classification Search
CPC .......... H01M 4/04; H01M 4/13; H01M 10/38; H01M 10/0436; H01M 10/0463; H01M 10/0481; H01M 50/406; H01M 50/443; H01M 50/46; H01M 50/466;
(Continued)

(56) References Cited

U.S. PATENT DOCUMENTS 7,404,829 B1 7/2008 Feger et al.
10,147,932 B2 12/2018 Park et al.
(Continued)

FOREIGN PATENT DOCUMENTS

CN 102386364 A 3/2012
CN 104247122 A 12/2014
(Continued)

OTHER PUBLICATIONS

Chinese Search Report for Application No. CN2016800448602 dated Dec. 23, 2019.
(Continued)

*Primary Examiner* — Kiran Quraishi Akhtar
(74) *Attorney, Agent, or Firm* — Lerner David LLP

(57) ABSTRACT

The secondary battery according to the present invention may comprise the separator pocket part having the accommodation groove in which the first electrode plate is accommodated and a radical unit provided as the second electrode plate disposed on one surface of the separator pocket part to secure the stacking property, safety, and insulation.

8 Claims, 9 Drawing Sheets

(51) Int. Cl.
*H01M 50/443* (2021.01)
*H01M 4/04* (2006.01)
*H01M 4/02* (2006.01)

(52) U.S. Cl.
CPC .... *H01M 50/466* (2021.01); *H01M 2004/027* (2013.01); *H01M 2004/028* (2013.01)

(58) Field of Classification Search
CPC ...... H01M 2004/027; H01M 2004/028; Y02E 60/10; Y02P 70/50
See application file for complete search history.

(56) References Cited

U.S. PATENT DOCUMENTS

| | | | |
|---|---|---|---|
| 2002/0119367 A1 | 8/2002 | Watanabe et al. | |
| 2007/0184340 A1* | 8/2007 | Ichikawa | H01M 50/46 29/623.1 |
| 2011/0135996 A1* | 6/2011 | Ahn | H01M 50/426 429/162 |
| 2012/0052372 A1 | 3/2012 | Ahn | |
| 2012/0202105 A1* | 8/2012 | Shinyashiki | H01M 10/052 429/153 |
| 2014/0212729 A1 | 7/2014 | Park et al. | |
| 2014/0272507 A1 | 9/2014 | Ku et al. | |
| 2015/0033547 A1 | 2/2015 | Yang et al. | |
| 2015/0064547 A1 | 3/2015 | Ahn et al. | |
| 2015/0099154 A1* | 4/2015 | Okuda | H01M 50/466 429/142 |
| 2016/0111699 A1 | 4/2016 | Ahn et al. | |

FOREIGN PATENT DOCUMENTS

| | | |
|---|---|---|
| JP | 2002252023 A | 9/2002 |
| JP | 2004071358 A | 3/2004 |
| JP | 2011096611 A | 5/2011 |
| JP | 2012074402 A | 4/2012 |
| JP | 2013235818 A | 11/2013 |
| JP | 2015506059 A | 2/2015 |
| JP | 2015513195 A | 4/2015 |
| KR | 100958649 B1 | 5/2010 |
| KR | 20110063899 A | 6/2011 |
| KR | 20140004015 A | 1/2014 |
| KR | 20150002523 A | 1/2015 |
| KR | 20150025420 A | 3/2015 |
| KR | 20150066711 A | 6/2015 |
| WO | 2013118627 A1 | 8/2013 |
| WO | 2013154155 A1 | 10/2013 |

OTHER PUBLICATIONS

European Search Report for Appl. No. 16864520.8 dated Jun. 6, 2018.
International Search Report (PCT/ISA/210) issued in PCT/KR2016/012664, dated Feb. 14, 2017.

* cited by examiner

SECONDARY BATTERY AND METHOD FOR MANUFACTURING THE SAME

CROSS-REFERENCE TO RELATED APPLICATION

This application is a divisional of U.S. application Ser. No. 15/744,325, which is a national phase entry under 35 U.S.C. § 371 of International Application No. PCT/KR2016/012664 filed Nov. 4, 2016, which claims priority from Korean Patent Application Nos. 2015-0158424, filed on Nov. 11, 2015, and 2016-0145522, filed on Nov. 3, 2016, all of which are hereby incorporated by reference in their entirety.

TECHNICAL FIELD

The present invention relates to a secondary battery and a method for manufacturing the same, and more particularly, to a secondary battery in which a stacking method is simplified while improving a degree of alignment in stacking of electrodes and a method for manufacturing the same.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

DISCLOSURE OF THE INVENTION

Technical Problem

A secondary battery comprises an electrode assembly and a pouch case accommodating the electrode assembly. The electrode assembly is classified into a stacked type structure, a winding type (jelly-roll-type) structure, and a stack and folding type structure. The stacked type structure has a structure in which electrode units (a positive electrode, a separator, and a negative electrode) of the electrode assembly are separately stacked.

Here, in the electrode assembly having the stacked type structure, since the electrode units, i.e., the positive electrode, the separator, and the negative electrode are separately stacked, uniform stacking is impossible. Particularly, the positive electrode and the negative electrode, which correspond to each other, come into contact with each other to cause short circuit.

The present invention has been made to solve the above-mentioned problem, and an object of the prevent invention is to provide a secondary battery in which electrode units (a positive electrode, a separator, and a negative electrode) are improved to simplify a stacking method while improving a degree of alignment in stacking of the electrodes and a method for manufacturing the same.

Technical Solution

To achieve the abovementioned object, a method for manufacturing a secondary battery according to an embodiment of the present invention comprises: a first step comprising a process of providing a second electrode sheet, a first separation sheet, and a second separation sheet to be vertically stacked, a process of continuously cutting a first electrode sheet having polarity different from that of the second electrode sheet to manufacture a plurality of first electrode plates, and a process of providing the plurality of first electrode plates between the first and second separation sheets; a second step of bonding the second electrode sheet, the first separation sheet, and the second separation sheet, which are stacked between the first electrode plates, to each other; a third step of cutting the bonded portions of the second electrode sheet, the first separation sheet, and the second separation sheet to manufacture a radical unit in which a second electrode plate, a first separator, a first electrode plate, and a second separator are stacked, wherein the first and second separators form a separator pocket part accommodating the first electrode plate, and a fourth step of stacking a plurality of radical units to manufacture an electrode assembly, wherein the second electrode plate and the separator pocket part have the same size.

The third step may further comprise a process of temporarily bonding the first electrode plate to the inside of the separator pocket part.

Each of the first and second separators may be provided as a safety-reinforcing separator (SRS).

In the second step, surfaces of the second electrode sheet, the first separation sheet, and the second separation sheet except for one surface thereof may be bonded to each other, and a first electrode tab coupled to the first electrode plate may be led out to the one surface of each of the first separation sheet and the second separation sheet.

The third step may further comprise a process of temporarily bonding the one surface of each of the second electrode sheet, the first separation sheet, and the second separation sheet, which are not bonded to each other.

In the fourth step, when two or more radical units are stacked, the radical units adjacent to each other may not be bonded to each other.

After the fourth step, the method may further comprise a fifth step of taping an outer circumferential surface of the electrode assembly by using an insulation tape.

After the fifth step, the method may further comprise a sixth step comprising a process of accommodating the electrode assembly in an accommodation part of a pouch and a process of injecting an electrolyte into the accommodation part of the pouch to impregnate the electrolyte into the electrode assembly, wherein bonding force between the first electrode plate and the separator pocket part may be gradually removed by the electrolyte and separated from each other so that the electrolyte is permeated up to the inside of the separator pocket part.

A secondary battery according to an embodiment of the present invention comprises: an electrode assembly in which at least one or more radical units, each of which is provided with a first electrode plate, a separator pocket part accommodating the first electrode plate, and a second electrode plate stacked on a top surface of the separator pocket part, are stacked, wherein the separator pocket part and the second electrode have the same size.

The separator pocket part may be provided with a first separator and a second separator, which are safety-reinforcing separators (SRS), and surfaces of the first separator and the second separator except for one surface thereof may be bonded to each other to accommodate the first electrode plate therein.

A first electrode tab may be coupled to the first electrode plate, and a second electrode tab may be coupled to the second electrode plate, and the first electrode tab may be led out to the outside through the one surface of the separator pocket part, which is not bonded.

The first electrode plate may have a size less than that of each of the separator pocket part and the second electrode plate.

The first electrode plate and the separator pocket part may be partially temporarily bonded to each other with bonding force less than that between the first separator and the second separator.

The bonding between the first electrode plate and the separator pocket part may be performed by applying a pressure and heat to the second electrode plate, the first separator, the first electrode plate, and the second separator.

The second electrode may be bonded together when the first separator and the separator are bonded to each other.

When two or more radical units are stacked, the radical units adjacent to each other may not be bonded to each other.

A second electrode plate may be further provided on a bottom surface of the separator pocket part of the lowermost radical unit.

An insulation tape may be attached to surround an outer circumferential surface of the electrode assembly.

The one surface of the separator pocket part, which is not bonded, may be temporarily bonded with the same bonding force as that between the first electrode and the separator pocket part after the first electrode is accommodated.

The secondary battery may further comprise a pouch accommodating the electrode assembly and an electrolyte injected into the pouch and impregnated into the electrode assembly, wherein the first electrode plate and the separator pocket part may be weakened in bonding force therebetween by the electrolyte and separated from each other, and the electrolyte may be introduced into a space between the first electrode plate and the separator pocket part and impregnated up to the inside of the separator pocket part.

Advantageous Effects

The secondary battery according to the present invention may comprise the separator pocket part having the accommodation groove in which the first electrode plate is accommodated and a radical unit provided as the second electrode plate disposed on one surface of the separator pocket part to secure the stacking property, safety, and insulation.

Also, the separator pocket part and the second electrode plate according to the present invention may have the same size to improve the degree of alignment in stacking of the electrodes and to achieve easiness of the battery manufacture and simplification the stacking method.

Also, the first electrode plate according to the present invention may be temporarily bonded to the separator pocket part to prevent the first electrode plate from moving. Furthermore, when the first electrode plate is impregnated into the electrolyte, the first electrode plate may be separated from the separator pocket part, and thus, the electrolyte may be permeated up to the inside of the separator pocket part to improve the impregnation of the electrolyte.

Also, the separator pocket part according to the present invention may comprise the first and second separators, and each of the first and second separators may be provided as the safety-reinforcing separators (SRC) to reduce the contraction rate thereof. Therefore, the separator pocket parts provided with the first and second separators may have the same size.

MODE FOR CARRYING OUT THE INVENTION

Figure 1:
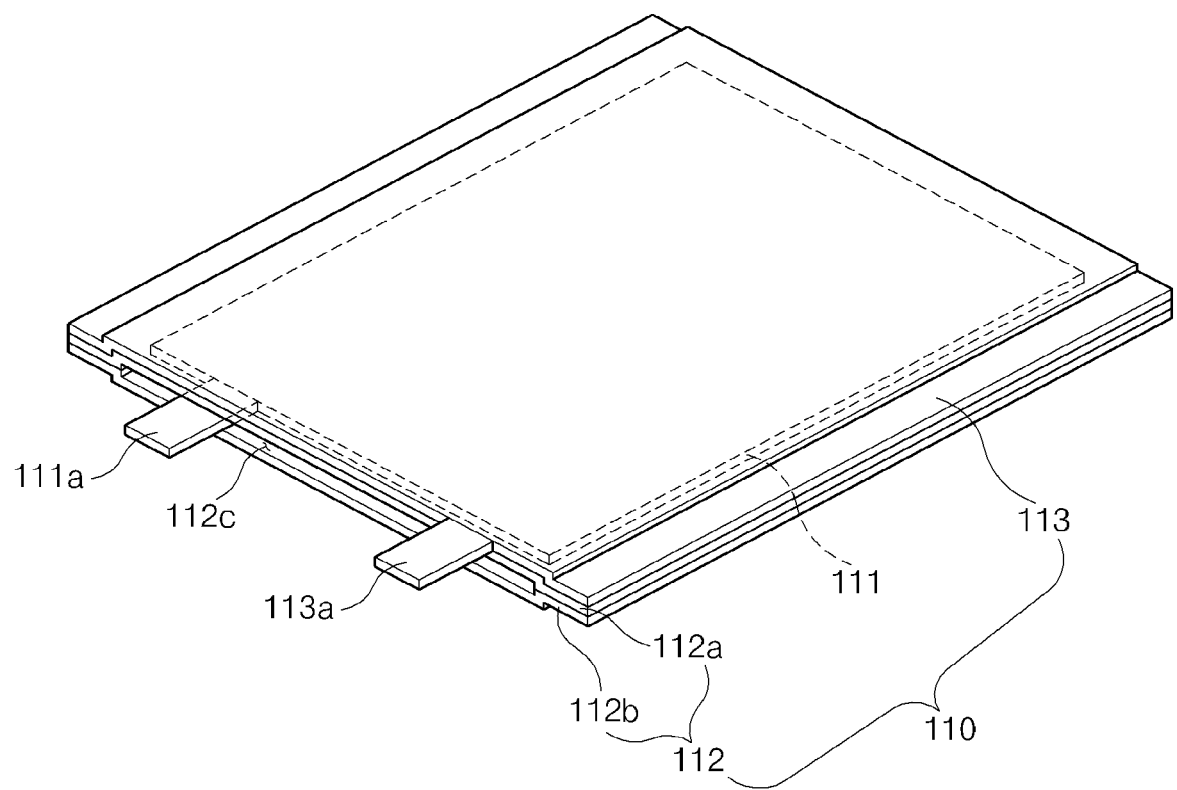
FIG. 1 is a perspective view of a radical unit according to an embodiment of the present invention.

Hereinafter, embodiments of the present invention will be described in detail with reference to the accompanying drawings in such a manner that the technical idea of the present invention may be easily carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to an Embodiment of the Present Invention]

Figure 7:
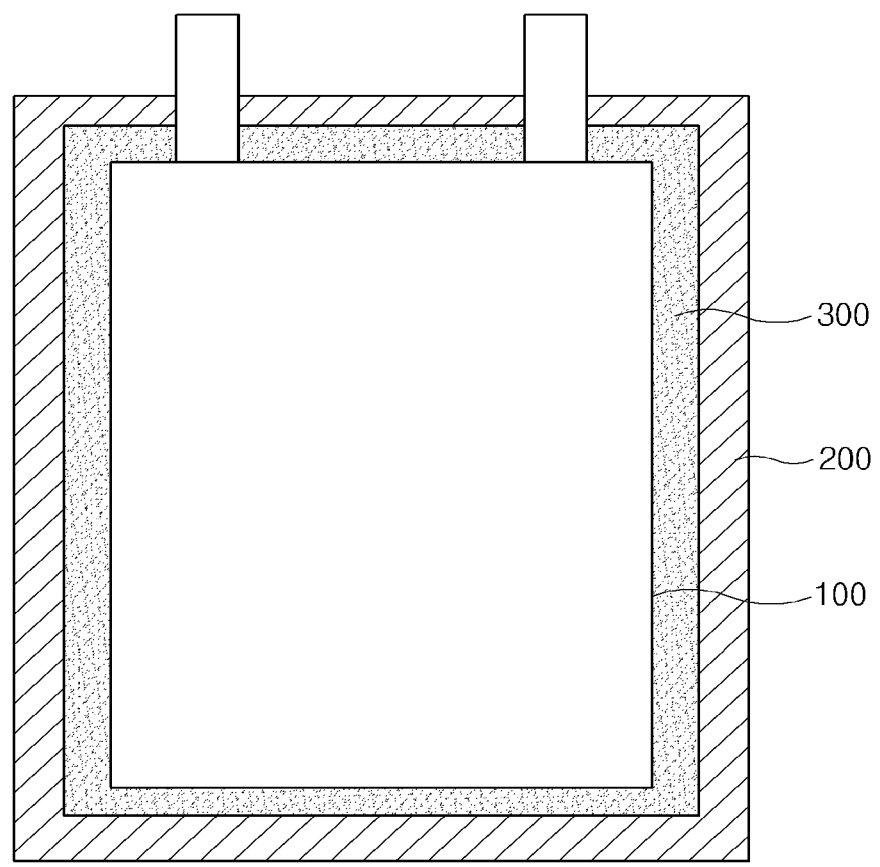
FIG. 7 is a cross-sectional view of a secondary battery according to an embodiment of the present invention.

As illustrated in FIGS. 1 and 7, a secondary battery according to an embodiment of the present invention comprises an electrode assembly 100 in which at least one or more radical units 110 are stacked. Each of the radical unit 110 comprises a first electrode plate 111, a separator pocket part 112 accommodating the first electrode plate 111, and a second separator plate 113 stacked on a top surface of the separator pocket part 112.

Here, the first electrode plate 111 is a positive electrode plate, and the second electrode plate 113 is a negative electrode plate.

Hereinafter, the secondary battery according to an embodiment of the present invention will be described in more detail.

Radical Unit

Figure 2:
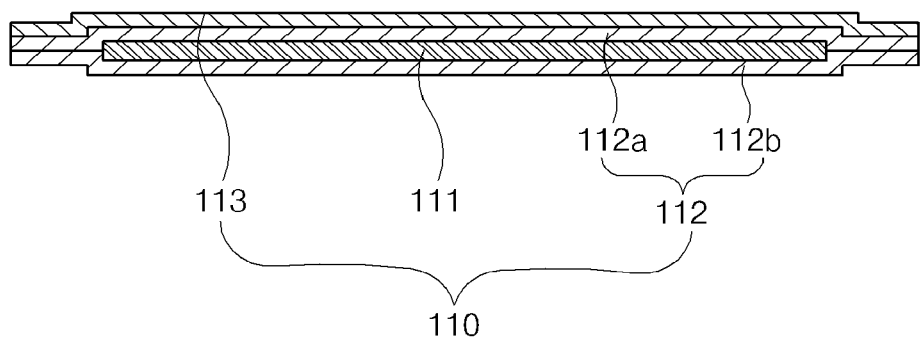
FIG. 2 is a side view of the radical unit according to an embodiment of the present invention.
Figure 3:
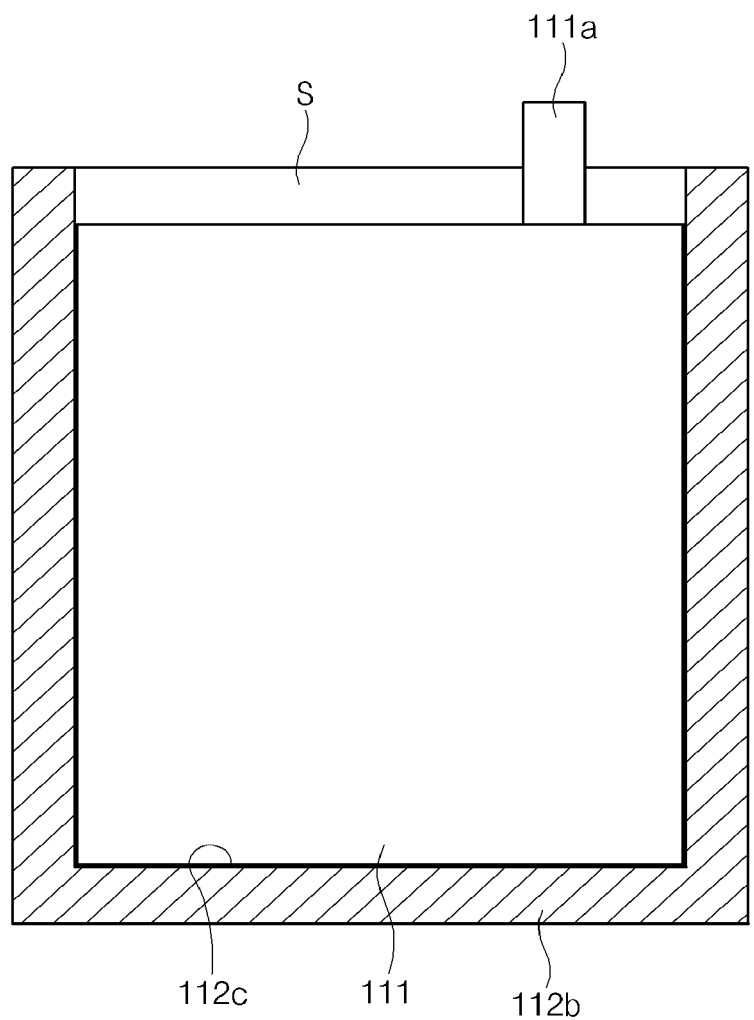
FIG. 3 is a plan cross-sectional view of the radical unit according to an embodiment of the present invention.

As illustrated in FIGS. 1 to 3, a radical unit 110 comprises a first electrode plate 111, a separator pocket part 112, and a second electrode plate 113. That is, the radical unit 110 has a structure in which the separator pocket part 112 accommodating the first electrode plate 111 and the second electrode plate 113 are vertically stacked.

Here, the separator pocket part 112 comprises a first separator 112*a* and a second separator 112*b*. The first separator 112*a* and the second separator 112*b* are bonded to each other to define an accommodation groove 112*c* in which the first electrode plate 111 is accommodated.

For example, the separator pocket part 112 comprises the first separator 112*a* and the second separator 112*b*, and the first separator 112*a* and the second separator 112*b* are vertically stacked to be bonded to each other except for one surface S of the separator pocket part 112, thereby defining an accommodation groove that is opened through the one surface S. Also, the first electrode plate 111 may be inserted and accommodated in the accommodation groove 112c. The separator pocket part 112 may selectively accommodation the second electrode plate 113 in addition to the first electrode plate 111.

For another example, the separator pocket part 111 comprises the first separator 112a and the second separator 112b, and the first separator 112a and the second separator 112b are stacked with the first electrode plate 111 therebetween. Also, surfaces of the first separator 112a and the second separator 112b, which are stacked, except for the one surface S may be bonded to each other to define the accommodation groove 112c in which the first electrode plate 111 is accommodated.

As described above, the radical unit 110 may be provided with the separator pocket part 112 to prevent the first electrode plate 111 and the second electrode plate 113 from coming into contact with each other, thereby preventing short circuit from occurring.

Here, the separator pocket part 112 and the second electrode plate 113, which are vertically stacked, have the same size. That is, the separator pocket part 112 and the second electrode plate 113 may have the same size to improve a degree of alignment in stacking of the electrodes, and the second electrode plate 113 may increase in size to the size of the separator pocket part 112 to maximize battery capacity.

However, although the separator pocket part 112 and the second electrode plate 113 have the same size, the separator pocket part 112 may be contracted by high-temperature heat and thus be reduced in size rather than that of the second electrode plate 113. To prevent this phenomenon from occurring, the first and second separators 112a and 112b that are provided as the separator pocket part 112 may be provided as safety-reinforcing separators (SRS) to prevent the separator pocket part 112 from being contracted by the high-temperature heat. Thus, the second electrode 113 and the separator pocket parts 112 provided with the first and second separators 112a and 112b may have the same size.

The SRS may not be contracted by high-temperature heat due to heat resistance of inorganic particles and may have a structure in which active layer components such as inorganic particles and a binder polymer are applied to a polyolefin-based separator base material.

A first electrode tab 111a is coupled to the first electrode plate 111, and a second electrode tab 113a is coupled to the second electrode plate 113.

Here, the first electrode plate 111 may be accommodated into the accommodation groove 112c of the separator pocket part 112 in a state in which the first electrode tab 111a is led out of the outside through one surface of the separator pocket part 112, which is not sealed. Thus, the first electrode tab 111a may be prevented from being bent or folded.

The first electrode plate 111 may have a size less than that of each of the separator pocket part 112 and the second electrode plate 113. That is, the first electrode plate 111 may have a size less than that of the separator pocket part 112 so that the first electrode plate 111 is accommodated into the accommodation groove 112c. That is to say, when the first electrode plate 111 is a positive electrode plate, and the second electrode plate 113 is a negative electrode plate, the first electrode plate 111 that is the positive electrode plate may have a size less than that of the second electrode plate 113 that is the negative electrode plate. Thus, the first electrode plate 111 having the relatively small size may be accommodated into the separator pocket part 112 to improve workability and efficiency.

Figure 9:
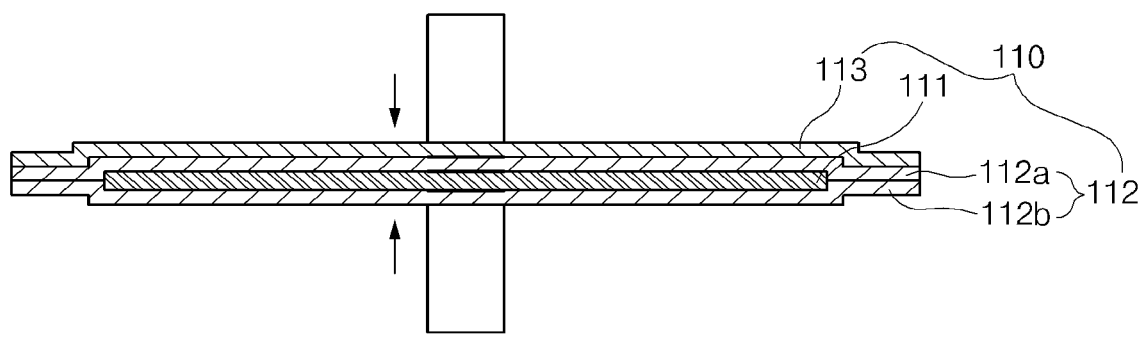
FIG. 9 is a view illustrating a state in which a first electrode plate is temporarily bonded according to an embodiment of the present invention.

Referring to FIG. 9, the first electrode plate 111 may be temporarily bonded to the accommodation groove 112c of the separator pocket part 112. Particularly, a portion of the first electrode plate 111 is temporarily bonded to the accommodation groove 112c of the separator pocket part 112 with bonding force less than that between the first separator 112a and the second separator 112b. Thus, the first electrode plate 111 may be prevented from moving. The temporary bonding between the first electrode plate 111 and the separator pocket part 112 may be released by impregnating the electrolyte. Thus, the electrolyte may be stably introduced through a space between the first electrode plate 111 and the separator pocket part 112 to improve the impregnation of the electrolyte.

That is, the first electrode plate 111 and the separator pocket part 112 are temporarily bonded to each other by applying heat and a pressure to the second electrode plate 113 and the separator pocket part 112 in the state in which the first electrode plate 111 is accommodated into the accommodation groove 112c. That is to say, heat and a pressure are applied to the second electrode plate 113, the first separator 112a, the first electrode plate 111, and the second separator 112b to temporarily bond the first electrode plate 111 to the first separator 112a and the second separator 112b. Alternatively, the second electrode plate 113 and the separator pocket part 112 may also be partially temporarily bonded to each other.

Here, the temporary bonding between the first electrode plate 111 and the separator pocket part 112 may be performed at the same time together with the bonding between the first separator 112a and the second separator 112b to simplify the process.

The second electrode plate 113 is bonded to the separator pocket part 112. Particularly, the second electrode plate 113 may be bonded together when the first separator 112a and the second separator 112b are bonded to each other. That is to say, the second electrode plate 113, the first separator 112a, and the second separator 112b may be bonded to each other on the surfaces except for the one surface to improve the simplification of the process.

The one surface of the separator pocket part 112, which is not sealed, may be partially bonded after accommodating the first electrode plate 111 to prevent the first electrode plate 111 from being led out of the outside.

In the radical unit 110 comprising the above-described constituents, the second electrode plate 113 and the separator pocket part 112 may have the same size to improve the degree of aliment in stacking of the electrodes and significantly prevent the first electrode plate 111 and the second electrode plate 113 from being short-circuited.

Electrode Assembly

Figure 4:
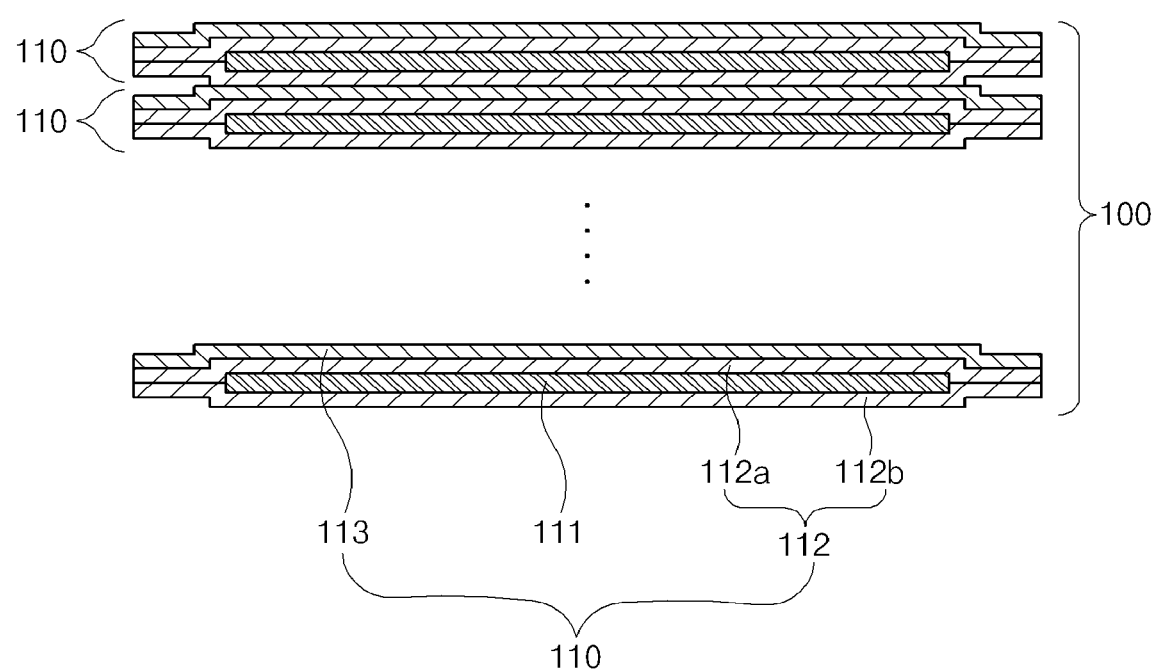
FIG. 4 is a view of an electrode assembly according to an embodiment of the present invention.

As illustrated in FIG. 4, the electrode assembly 100 has a structure in which at least one or more radical units 110 are stacked.

Particularly, the electrode assembly has a structure in which two or more radical units 110 are stacked. When the two or more radical units 110 are stacked, the radical units 110 adjacent to each other may not be bonded to each other or may be bonded to each other with bonding force less than that between the separator pocket part 112 and the second electrode plate 113. That is, the radical units 110 may be separated from each other into units of the radical unit without damaging the second electrode plate 113 due to a difference in bonding force.

Figure 5:
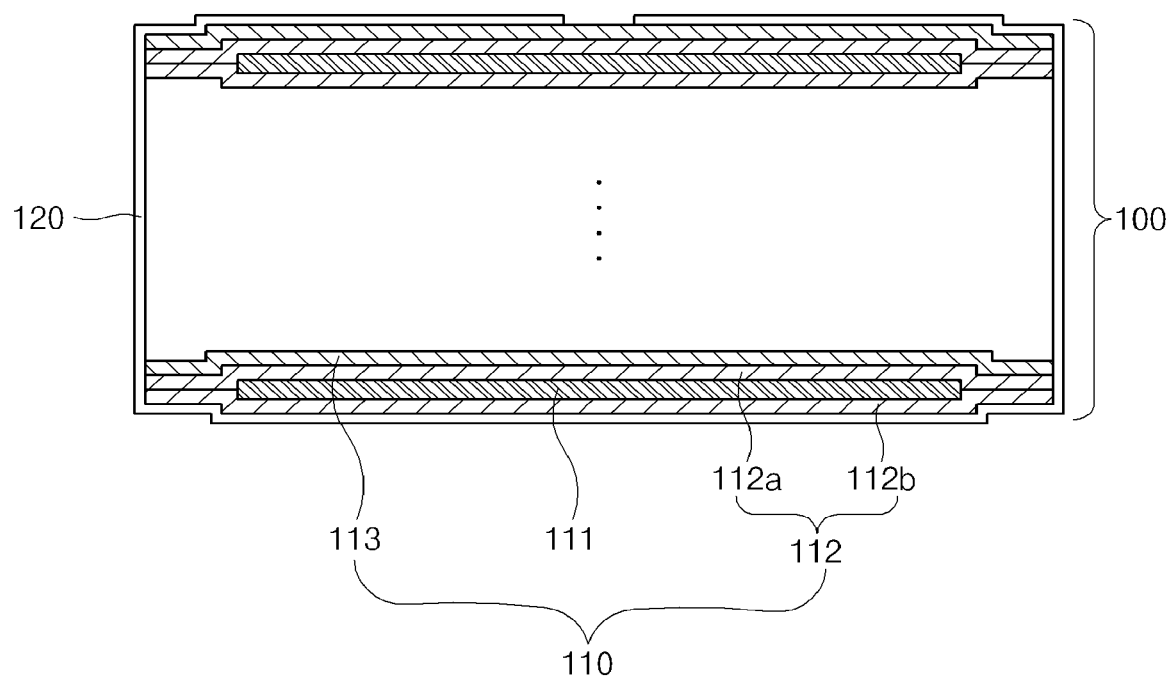
FIG. 5 is a view of the electrode assembly to which an insulation tape is attached according to an embodiment of the present invention.

As illustrated in FIG. 5, the electrode assembly 100 comprises an insulation tape 120 surrounding an outer circumferential surface of the one or more radial units 110 which are stacked. The insulation tape 120 fixes the stacked radical units 110 without moving. Here, the insulation tape 120 may be attached to the entirety of the stacked radical units and be attached to only a portion of the stacked radical units.

Figure 6:
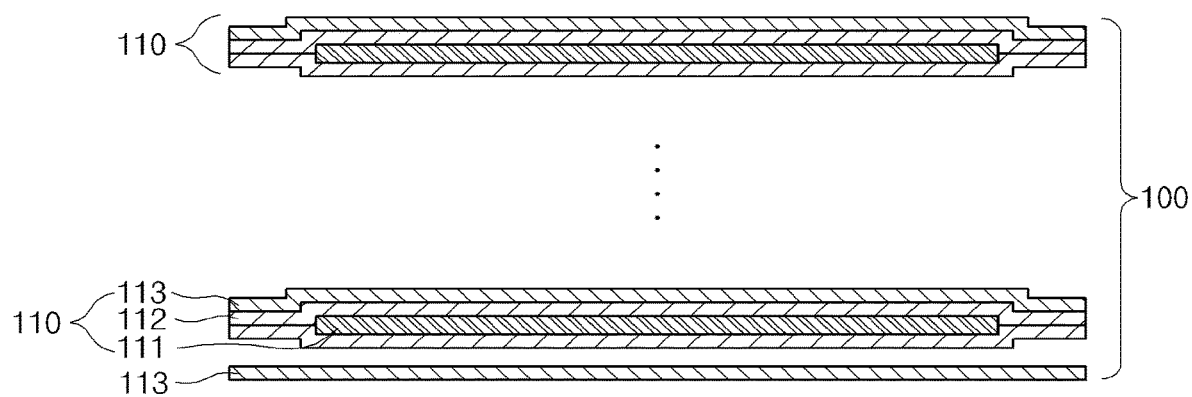
FIG. 6 is a view illustrating a state in which a second electrode plate is disposed on the outermost portion in the electrode assembly according to an embodiment of the present invention.

As illustrated in FIG. 6, the electrode assembly 100 further comprises the second electrode plate on a bottom surface of the separator pocket part 112 of the lowermost radical unit 110. Thus, a structure in which the second electrode plate 113 is disposed on each of the uppermost end and the lowermost end of the electrode assembly 100 may be realized.

Thus, the electrode assembly 100 according to the present invention may comprise the radical unit 110 having a new structure to simplify the stacking method.

Also, the electrode assembly 100 has a structure in which one or more radical units 110, in which the second electrode plate 113 and the separator pocket part 112 have the same size, are stacked. Thus, the degree of alignment in stacking of the electrodes may be improved, and the battery may be easily manufactured.

Secondary Battery

As illustrated in FIG. 7, a secondary battery comprises the electrode assembly 100, a pouch 200 accommodating the electrode assembly 100, and the electrolyte 300 injected into the pouch 200 and impregnated into the electrode assembly 100.

That is, in the secondary battery, when the electrode assembly 100 and the electrolyte 300 are accommodated into the pouch, the electrolyte 300 may be gradually impregnated into the electrode assembly 100 to improve battery performance. Here, the electrolyte 300 may be gradually impregnated into the first and second separators 112a and 112b to release the temporary bonding between the first electrode plate 111 and the separator pocket part 112. Thus, the electrolyte may be injected into the space between the first electrode plate 111 and the separator pocket part 112 to impregnate the electrolyte 300 up to the inside of the separator pocket part 112.

In the secondary battery having the above-described constituents, the degree of alignment in stacking of the electrodes may be improved, and the battery may be easily manufactured.

Hereinafter, a method for manufacturing the secondary battery according to an embodiment of the present invention will be described.

[Method for Manufacturing Secondary Battery According to an Embodiment of the Present Invention]

Figure 8:
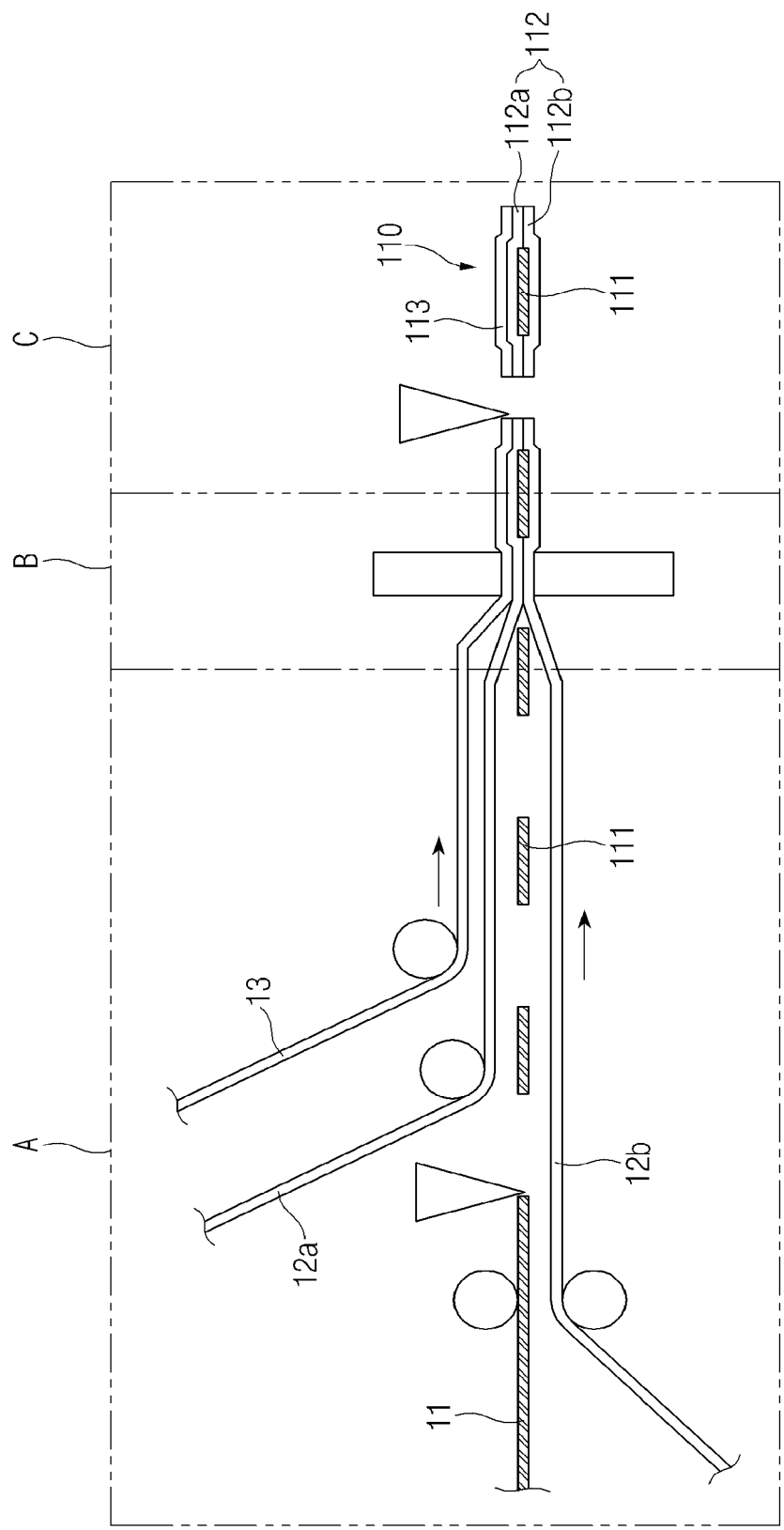
FIG. 8 is a process view illustrating a method for manufacturing the secondary battery according to an embodiment of the present invention.

As illustrated in FIG. 8, a method for manufacturing the secondary battery according to an embodiment of the present invention comprises a first step of providing a second electrode sheet 13, a first separation sheet 12a, a second separation sheet 12b, and a first electrode plate 11, a second step of bonding the second electrode sheet 13, the first separation sheet 12a, and the second separation sheet 12b to each other, and a third step of cutting the portions bonded in the second step, and a fourth step of manufacturing an electrode assembly 100.

First Step

Referring to an A block portion illustrated in FIG. 8, the first step comprises a process of providing the second electrode sheet 13, the first separation sheet 12a, and the second separation sheet 12b, each of which has a long sheet shape, to be vertically stacked, a process of continuously cutting the first electrode sheet 11 having polarity different from that of the second electrode sheet 13 to manufacture a plurality of electrode plates 111, and a process of providing the plurality of first electrode plates 111 between the first and second separation sheets 12a and 12b.

Here, the second electrode sheet 13, the first separation sheet 12a, and the second separation sheet 12b may have the same size, and the first electrode sheet 11 may have a size less than that of the second electrode sheet 13. Also, the first separation sheet 12a and the second separation sheet 12b may be provided as safety-reinforcing separators (SRS) to prevent each of the first and second separation sheets 12a and 12b from being contracted by high-temperature heat.

Second Step

Referring to a B block portion illustrated in FIG. 8, in the second step, the second electrode sheet 13, the first separation sheet 12a, and the second separation sheet 12b, which are stacked between the first electrode plate 111 and the first electrode plate 111, which correspond to each other, are bonded to each other by applying heat and a pressure.

Here, surfaces of the second electrode sheet 13, the first separation sheet 12a, and the second separation sheet 12b except for one surface thereof may be bonded to each other, i.e., the second electrode sheet 13, the first separation sheet 12a, and the second separation sheet 12b may be bonded to each other at once. Therefore, the process may be simplified.

Third Step

Referring to a C block portion illustrated in FIG. 8, in the third step, the bonded portions of the second electrode sheet 13, the first separation sheet 12a, and the second separation sheet 12b, which are bonded to each other in the second step, are cut to manufacture a radical unit 110 in which the a second electrode plate 113, a first separator 112a, a first electrode plate 111, and a second separator 112b are stacked.

Here, the first and second separators 112a and 112b provides a separator pocket part 112 accommodating the electrode plate 111 to prevent the first electrode plate 111 and the second electrode plate 113 from coming into contact with each other, thereby preventing short circuit from occurring.

Particularly, the second electrode plate 113 and the separator pocket part 112 have the same size. That is, the second electrode sheet 13, the first separation sheet 12a, and the second separation sheet 12b, which have the same size, may be bonded to each other, and then, the bonded portions may be cut to provide the second electrode plate 113 and the separator pocket part 112, which have the same size. Thus, a degree of alignment in stacking of the electrodes may be improved, and the battery may be easily manufactured.

Referring to FIG. 9, the third step further comprises a process of temporarily bonding the first electrode plate 111 to the inside of the separator pocket part 112. That is, when the electrode assembly is manufactured, the first electrode plate 111 accommodated in the separator pocket part 112 may be withdrawn to the outside while moving. To prevent this phenomenon from occurring, the process of temporarily bonding the first electrode plate 11 to the inside of the separator pocket part 112 may be further performed.

Particularly, heat and a pressure may be applied to the separator pocket part 112 in which the second electrode plate 113 and the first electrode plate 111 are accommodated to temporarily bond the first electrode plate 111 to the inside of the separator pocket part 112.

Here, the bonding between the first electrode plate 111 and the separator pocket part 112 may be adjusted in bonding force so that the first electrode 111 and the separator pocket part 112 are easily separated from each other when the electrolyte is impregnated. For example, the bonding force between the first electrode plate 111 and the separator pocket part 112 may be less than that between the first separator 112a and the second separator 112b. Thus, when the electrolyte is impregnated, the first electrode plate 111 and the separator pocket part 112 may be easily separated from each other.

Referring to FIG. 1, in the third step, the first electrode tab 111a is coupled to the first electrode plate 111, and the second electrode tab 113a is coupled to the second electrode plate 113. Also, the first electrode tab 111a may be led out to the one surface on which the first separation sheet 12a and the second separation sheet 12b are not bonded to each other.

A process of temporarily bonding the one surface of each of the second electrode sheet 13, the first separation sheet 12a, and the second separation sheet 12b, which are not bonded to each other, may be further performed. That is, the one surface of each of the second electrode sheet 13, the first separation sheet 12a, and the second separation sheet 12b may be temporarily bonded to prevent the first electrode plate 111 accommodated between the first separation sheet 12a and the second separation sheet 12b from being withdrawn.

Fourth Step

Referring to FIG. 4, in the fourth step, two or more radical units 110 manufactured in the third step are stacked to manufacture the electrode assembly 100.

Here, when the two or more radical units 110 are stacked, the radical units 110 adjacent to each other may not be bonded to each other. Thus, the radical units 110 adjacent to each other may be easily separated from each other, and particularly, the second electrode plate 113 may be prevented from being damaged.

When the fourth step is completed, a fifth step of taping the electrode assembly 100 is further performed.

Fifth Step

Referring to FIG. 5, in the fifth step, the entire or a portion of an outer circumferential surface of the electrode assembly 110 in which the one or more radical units 110 are stacked may be taped and fixed by using an insulation tape 120.

When the fifth step is completed, a sixth step of manufacturing the secondary battery is further performed.

Sixth Step

Referring to FIG. 7, the sixth step comprises a process of accommodating the electrode assembly 100 manufactured in the fifth step into the accommodation part of the pouch 200 and a process of injecting the electrolyte 300 into the accommodation part of the pouch 200 to impregnate the electrolyte into the electrode assembly 100.

Here, the electrolyte 300 is impregnated into the separator pocket part 112 provided in the electrode assembly 100. Here, the bonding force between the first electrode plate 111 and the separator pocket part 112 may be gradually removed by the electrolyte 300 and thus separated from each other. Thus, the electrolyte 300 may be permeated up to the inside of the separator pocket part 112 through the space between the first electrode plate 111 and the separator pocket part 112 to improve the impregnation.

As described above, in the method for manufacturing the secondary battery according to an embodiment of the present invention, the secondary battery having the improved degree of alignment in stacking of the electrodes may be obtained.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing a secondary battery, the method comprising:
 a first step comprising a process of providing a second electrode sheet, a first separation sheet, and a second separation sheet to be vertically stacked, a process of continuously cutting a first electrode sheet having polarity different from that of the second electrode sheet to manufacture a plurality of first electrode plates, and a process of providing the plurality of first electrode plates between the first and second separation sheets;
 a second step of bonding the second electrode sheet, the first separation sheet, and the second separation sheet, which are stacked between the first electrode plates, to each other;
 a third step of cutting the bonded portions of the second electrode sheet, the first separation sheet, and the second separation sheet to manufacture a radical unit in which a second electrode plate, a first separator, a first electrode plate, and a second separator are stacked, wherein the first and second separators define a first dimension and form a separator pocket part having a second dimension smaller than the first dimension, the separator pocket part accommodating the first electrode plate, and
 a fourth step of stacking a plurality of radical units to manufacture an electrode assembly,
 wherein the second electrode plate has a dimension equal to the first dimension of the first and second separators.

2. The method of claim 1, wherein the third step further comprises a process of temporarily bonding the first electrode plate to the inside of the separator pocket part.

3. The method of claim 1, wherein each of the first and second separators is provided as a safety-reinforcing separator (SRS).

4. The method of claim 1, wherein, in the second step, surfaces of the second electrode sheet, the first separation sheet, and the second separation sheet except for one surface thereof are bonded to each other, and
 a first electrode tab coupled to the first electrode plate is led out to the one surface of each of the first separation sheet and the second separation sheet.

5. The method of claim 4, wherein the third step further comprises a process of temporarily bonding the one surface of each of the second electrode sheet, the first separation sheet, and the second separation sheet, which are not bonded to each other.

6. The method of claim 1, wherein, in the fourth step, when two or more radical units are stacked, the radical units adjacent to each other are not bonded to each other.

7. The method of claim 1, after the fourth step, further comprising a fifth step of taping an outer circumferential surface of the electrode assembly by using an insulation tape.

8. The method of claim 7, after the fifth step, further comprising a sixth step comprising a process of accommodating the electrode assembly in an accommodation part of a pouch and a process of injecting an electrolyte into the accommodation part of the pouch to impregnate the electrolyte into the electrode assembly,
 wherein bonding force between the first electrode plate and the separator pocket part is gradually removed by the electrolyte and separated from each other so that the electrolyte is permeated up to the inside of the separator pocket part.

\* \* \* \* \*